Jan. 7, 1930.  A. MELDRUM  1,742,965
VEHICLE WHEEL
Filed Feb. 4, 1927
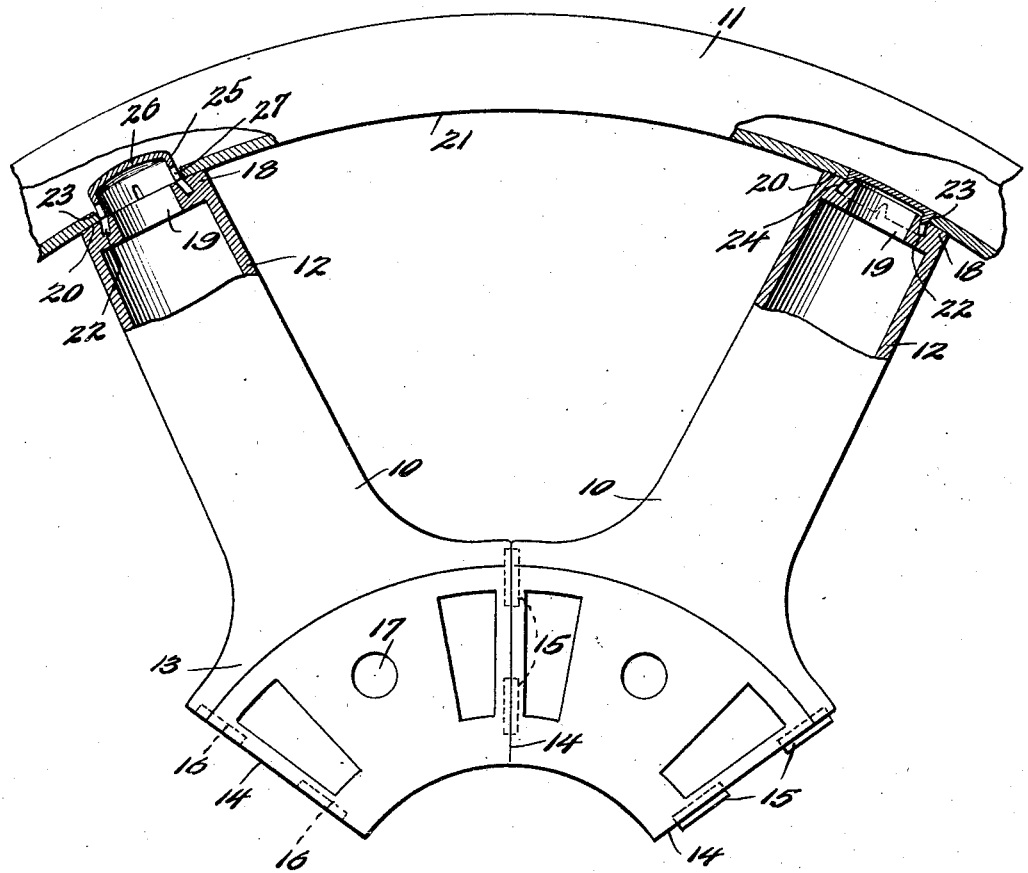
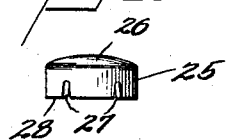
Inventor
Alexander Meldrum,
By Watson, Coit, Morse & Grindle
Attorney Patented Jan. 7, 1930

1,742,965

UNITED STATES PATENT OFFICE

ALEXANDER MELDRUM, OF SYRACUSE, NEW YORK, ASSIGNOR, BY MESNE ASSIGNMENTS, TO HURLBURT W. SMITH AND WILBERT L. SMITH, BOTH OF SYRACUSE, NEW YORK

VEHICLE WHEEL

Application filed February 4, 1927. Serial No. 165,976.

This invention relates to vehicle wheels and more particularly to all metal vehicle wheels having a plurality of individual spokes.

It is a general object of the present invention to provide a novel and improved form of all metal vehicle wheel.

One of the features of the invention consists in providing means whereby the spokes may be first assembled into a rigid spider over which the felloe is shrunk or upset and fastening means then applied to retain the ends of the spokes in their proper relation to the felloe.

The primary object of the invention consists in the provision of a vehicle wheel having hollow cast metal spokes, each spoke being provided, at its outer end, with a surface adapted to abut the inner surface of the felloe and having an annular groove with tapered walls, the felloe having a tapered hole therein substantially concentric with the groove, there being a malleable cup forced thru the hole and expanded into the tapered groove and having its bottom expanded into engagement with the walls of the hole in the felloe to securely fasten the spoke ends and felloe together.

Other and further objects and features of the invention will be more apparent to those skilled in the art after a consideration of the accompanying drawing and following specification wherein are disclosed two exemplary embodiments of the invention with the understanding, however, that various changes may be made therein such as fall within the scope of the appended claim without departing from the spirit of the invention.

In said drawing:

Figure 1 is a side elevation showing two spokes and a portion of the felloe of a vehicle wheel, the ends of the spokes and the adjoining sections of the felloe being shown in section on a medium plane in one case before joining, and in the other case after joining together;

Figure 2 is a side elevation of the cup used for effecting the joint; and

Figure 3 is a similar view of a modified form of the cup.

In order that a vehicle wheel, comprising a plurality of individual spokes having segmental ends, may be assembled by securing the segmental ends of the spokes together to form a hub with the spokes radiating therefrom and a felloe be then placed in position thereover, it is necessary that there be no substantial projections beyond the ends of the spokes which abut against the inner periphery of the felloe. The present invention contemplates a means of attaching the ends of the spokes to the felloe without such projections.

In the drawing, Fig. 1 shows two complete spokes 10 and a portion of a felloe 11. Each spoke has a hollow tubular portion, formed by the thin walls 12, and a segmental inner end 13 provided with two radial faces 14 such that when the radial faces of a full complement of spokes are brought into abutting relation a circular hub structure is formed as indicated.

To insure individual spokes against movement in respect to each other when the felloe is placed in position the segmental ends are secured together by the dowels 15 fitting into recesses 16 into the radial faces 14. Assembly of all of the spokes into a spider is effected by arranging them in a fixture and simultaneously moving the spokes radially inwardly until all of the dowels are received in the recesses in the adjacent radial faces. Such a spider has considerable strength and may be handled independently, before the application of side or hub plates (not shown), which may be bolted together and to the spokes by bolts passing thru the holes 17 in the segmental ends of the spokes.

The outer end of each spoke is thickened as at 18 to reinforce the same and is preferably provided with a central hole 19 which may be formed as a result of the casting operation. The ends 20 of the spokes are machined by any suitable process to a configuration such that they may tightly abut the inner periphery 21 of the felloe. The outer end of each spoke beyond the hole 19 is provided with annular groove 22, the walls of which may be, but are not necessarily, parallel to each other and flare or taper outwardly from the end of the spoke toward the center as clearly shown in Fig. 1.

After the spider has been assembled the felloe is arranged over it either by shrinking the same into position to form a tight fit with the ends 20 or by an upsetting operation producing the same result. The felloe is provided with a plurality of holes 23 each substantially concentric with one of the annular grooves 21 in the end of a corresponding spoke. These holes 23 are each countersunk or tapered and have their larger diameter in the outer surface of the felloe, the smaller diameter being substantially the same as the diameter of the outer wall of the annular groove where it intersects the end 20 of the spoke. The wall of the hole 23 and the outer wall 24 of the groove 22 may be said to lie on the surface of a pair of abutting concentric truncated cones.

An attaching cup is provided for each spoke end. This cup may well be a stamping from some malleable metal such as steel and takes the initial form shown in Fig. 2 and in the left hand spoke of Fig. 1. The walls 25 are substantially cylindrical and the bottom is bulged or formed to a crown shape 26. As shown in Fig. 2 the walls 25 are provided with a plurality, preferably four, of notches 27 opening into the lower edge 28 of the cup. The outside diameter of this cup is substantially equal to the smallest diameter of the hole 22 in the felloe. A cup is placed in the position shown in the left hand spoke of Fig. 1 and by the application of suitable force is driven until the bottom edge 28 reaches substantially the bottom of the groove 22, the walls 25 being caused to expand or flare by following the inner wall of the groove 22 and thus the outer surface of the wall 25 engages under the wall 24 of the groove and prevents withdrawal of the cup. By the application of siutable force the crown 25 is flattened to the position shown in the right hand spoke which causes it to increase in diameter and force the upper part of the outer wall 25 of the cup into engagement with the tapering walls of the hole 23 in the felloe.

The cup may have its bottom and contiguous walls preformed to the shape shown in the right hand spoke of Fig. 1 if desired. While the notches in the cup have been shown as expanded to allow the lower portion of the wall to fit into the expanding groove 22, an equally effective result can be obtained by omitting the notches and causing the open end of the cup to stretch sufficiently to fit within the groove. Such a cup is shown in Fig. 3.

When the joint is complete, as shown at the right of Fig. 1 the two opposite tapers, in the groove and the felloe hole are locked together by the double tapered wall of the cup and the end of the spoke is held in tight engagement with the felloe and this engagement is retained tight irrespective of any stretching and increase in circumference of the felloe which may result from use. The joint will remain tight and effectively prevent squeaking and rattling.

Having thus described the invention, what is claimed as new and desired to be secured by Letters Patent is:

In a vehicle wheel, the combination with a felloe having a tapered hole therethrough and a spoke having a groove in the end thereof the periphery of which is different at the bottom than at the top, of a joining member comprising a cup having a crowned bottom adapted to be passed through said hole and driven into said groove, the force of driving serving to conform the walls of the cup to the walls of the groove and to flatten said crowned bottom to expand the same to engage the tapered walls of said felloe hole.

In testimony whereof I hereunto affix my signature.

ALEXANDER MELDRUM.